(12) United States Patent
Wheeler

(10) Patent No.: US 10,610,763 B2
(45) Date of Patent: Apr. 7, 2020

(54) PRESSURIZED INJECTABLE MOUTHPIECE

(71) Applicant: Clarence Wheeler, Atlanta, GA (US)

(72) Inventor: Clarence Wheeler, Atlanta, GA (US)

(*) Notice: Subject to any disclaimer, the term of this patent is extended or adjusted under 35 U.S.C. 154(b) by 0 days.

(21) Appl. No.: 16/240,783

(22) Filed: Mar. 31, 2019

(65) Prior Publication Data

US 2019/0232151 A1    Aug. 1, 2019

(51) Int. Cl.
*A63B 71/08* (2006.01)
*A23L 33/10* (2016.01)
*A61C 19/06* (2006.01)

(52) U.S. Cl.
CPC ............ *A63B 71/085* (2013.01); *A23L 33/10* (2016.08); *A63B 71/081* (2013.01); *A61C 19/063* (2013.01)

(58) Field of Classification Search
CPC .... A63B 71/085; A63B 71/081; A61C 19/063
See application file for complete search history.

(56) References Cited

U.S. PATENT DOCUMENTS

| | | | | |
|---|---|---|---|---|
| 2016/0256762 A1* | 9/2016 | Tucker | ................ | A63B 71/081 |
| 2017/0282046 A1* | 10/2017 | Wheeler | ............... | A63B 71/085 |
| 2018/0071611 A1* | 3/2018 | Durbin | ................ | A47G 21/185 |
| 2018/0147473 A1* | 5/2018 | Franklin | ............... | A63B 71/081 |

* cited by examiner

*Primary Examiner* — Kristen Matter

(57) ABSTRACT

An pressurized injectable mouthpiece for athletes in contact sports and other activities. The present invention is configured to be used at an pressurized fashion and is able to be injected with an gel-like supplement. The pressurized injectable mouthpiece comprises of an tab at the front base of the mouthpiece. Further, the present invention comprises suction vents throughout the outer base portion of the mouthpiece. The pressurized injectable mouthpiece further comprises air pockets coupled throughout the inner portion of the mouthpiece allowing the present invention to be used at an pressurized fashion.

11 Claims, 13 Drawing Sheets

PRESSURIZED INJECTABLE MOUTHPIECE

BACKGROUND OF THE INVENTION

Field of the Invention

The present invention relates to an mouthpiece for athletes in physical contact sports.

BRIEF SUMMARY OF THE PRESENT INVENTION

The present invention relates to an pressurized injectable mouthpiece. The invention is configured to be injected with a supplement. Further, the present invention comprises an tab at the front base of the mouthpiece and lip guard for enclosing the injecting hole. In addition, the present invention comprises suction vents at the top outer base of the mouthpiece allowing an supplement to escape from the mouthpiece. Additionally, the present invention includes a extended region comprising an plurality of channels which allow supplement to be distributed throughout the pressurized chamber at different regions. The invention comprises an plurality of air pockets that allow the entire mouthpiece to be used in a regulated pressurized fashion. The overall structuring of the pressurized injectable mouthpiece can be an rubber like material such as ethyl vinyl acetate (EVA), Kraton styrene polymer material, PVC, ENGAGE, or polyethylene polymer that's further formed by an molding or 3D-printed process method.

BRIEF DESCRIPTION OF THE SEVERAL VIEWS OF THE DRAWINGS

These and other features and advantages of the present invention will become more readily appreciated as the same becomes better understood by reference to the following detailed description when considered in connection with the accompanying drawings, wherein;

FIG. 1G-1M is a perspective view showing structuring of the present invention.

DETAILED DESCRIPTION OF THE INVENTION

Referring to FIGS. 1A-1D, wherein like numerals indicated like or corresponding features throughout the view, a exemplary pressurized injectable mouthpiece is generally shown at (1) for purpose of illustration and not to be in any way limiting.

Figure 1A:
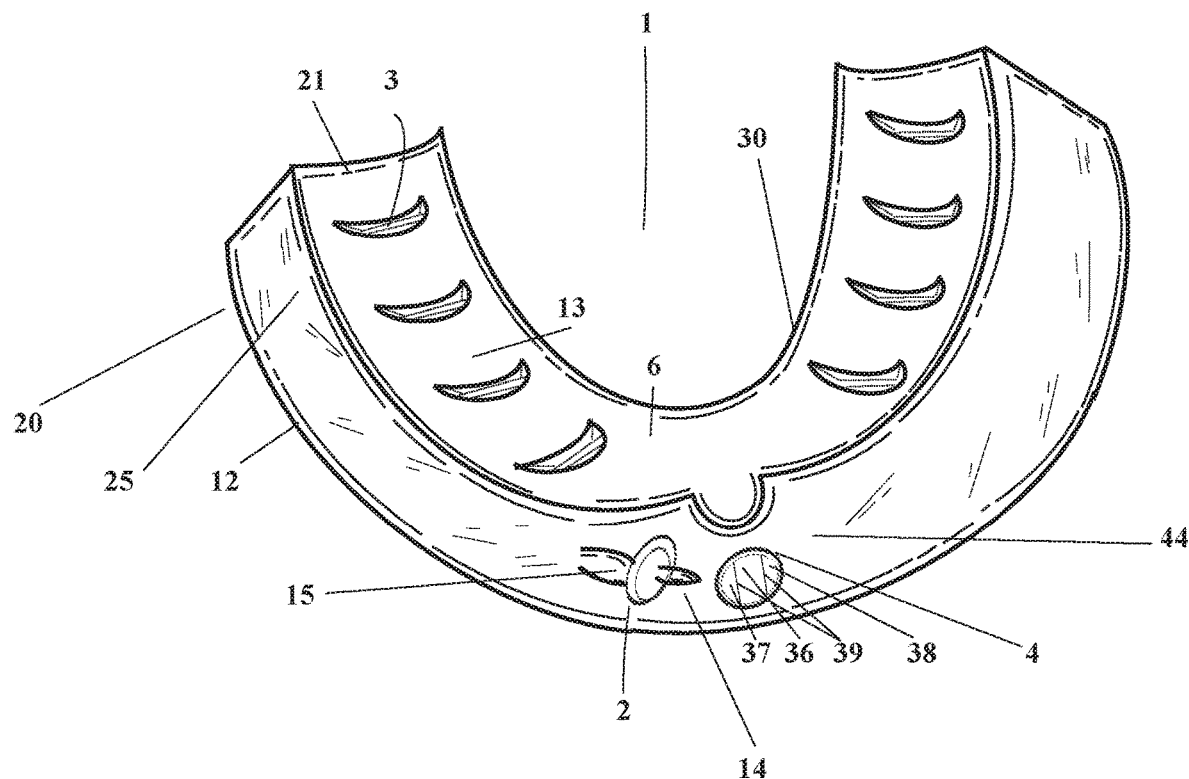
FIG. 1A-1E is a fragmentary perspective view of the present invention.

Specifically, referring to FIG. 1A-ID a pressurized injectable mouthpiece (1) is contoured as a U-shape object, and further made of a rubber type of material as ethyl vinyl acetate (EVA), Kraton styrene polymer material, PVC, and ENGAGE, a polyethylene polymer product produced by DOW chemical, or an similar material known to one skilled in the art(s). Further, the pressurized injectable mouthpiece (1) is formed by an molding process or (SLS) 3D printing process. The 3D printing process may be performed by companies like Palmiga Innovations website Palmiga.com, Rubber 3Dprinting website rubber3dprinting.com, i,materialise at Technolgielaan 15, 3001 Leuven website i.materialise.com, 3D-Alchemy 28 Shrewsbury Rd Edgmond Shropshire TF10 8HU, UK Email: info3d-alchemy.com.uk Tel: +44 (0) 1952 820 453 Company No: 301 3456 VAR No: 656138328, Amsterdam Frederiksplein 421017XN Amsterdam 1-347-708-1683 website 3dhubs.com.

More of, the pressurized injectable mouthpiece (1) comprises a bottom portion (20) and top portion (21), further the bottom portion (20) and top portion (21) composes an plurality of respectively spaced inner walls (30) and outer walls (25) that curve inwardly and slightly recessed forming the U-shape pressurized chamber (13), which allocates a thick density supplement as gel to arrange within the pressurized chamber (13) further allocating the supplement to deviate the suction vents (3) when a combined pressure is applied equally to the pressure chamber (13) outer top base (6) and outer bottom base (12). Further, the U-shaped pressurized chamber (13) is configured to retain a supplement in conjunction with pressure when the tab (2) is introduced into the injection hole (4).

More of, the pressurized injectable mouthpiece (1) composes a injection hole (4) approximately 3 mm to 6 mm in diameter of a quadrilateral, spherical, or elliptical shape. The injection hole (4) further comprises a partial recessed groove region boarding the injection hole (4) edges so that when the tab (2) is affixed at the injection hole (4) the tab (2) outer edges respectively corresponds and seats within the grooved region thereon. The injection hole (4) comprises two respectively vertical walls (39) adjacent each other at the grooved region edges that respectively bifurcate the midpoint channel (36), left channel (37) and right channel (38) and further corresponds with the extended region (18) midpoint channel (36) left channel (37) and right channel (38). Further, the midpoint channel (36) respectively dispenses a supplement to both left and right regions of the pressurized chamber (13) via the extended region (18) midpoint channel (36), while the left channel (37) respectively dispenses a supplement to the left region of the pressurized chamber (13) via the extended region (18) left channel (37), and the opposing right channel (38) respectively dispenses a supplement at the right region of the pressurized chamber (13) via the extended region (18) right channel (38) whereas the combination of channels give a user an plurality of predetermine regulated options at which region of the pressurized chamber (13) a supplement is to be dispensed.

Further, the injection hole (4) is formed at a mid center region of the pressurized injectable mouthpiece (1) front base region, further allowing a quadrilateral, spherical or elliptical shape package funnel, nipple or rim to introduce within the injectable hole (4) and supply a gel-texture supplement within the pressurized chamber (13).

Alternatively, the injection hole (4) is formed at the mid center region of the lip guard (9) front face, further corresponding with the hollow U-shape extended region (18). Specifically, the injection hole (4) forms a narrow hollow channel (40) within the lip guard (9) that respectively corresponds with the extended region (18) allocating a supplement to dispense within the pressurized chamber (13) via the midpoint channel (36) left channel (37), right channel (38) or a combination thereof.

Figure 1B:
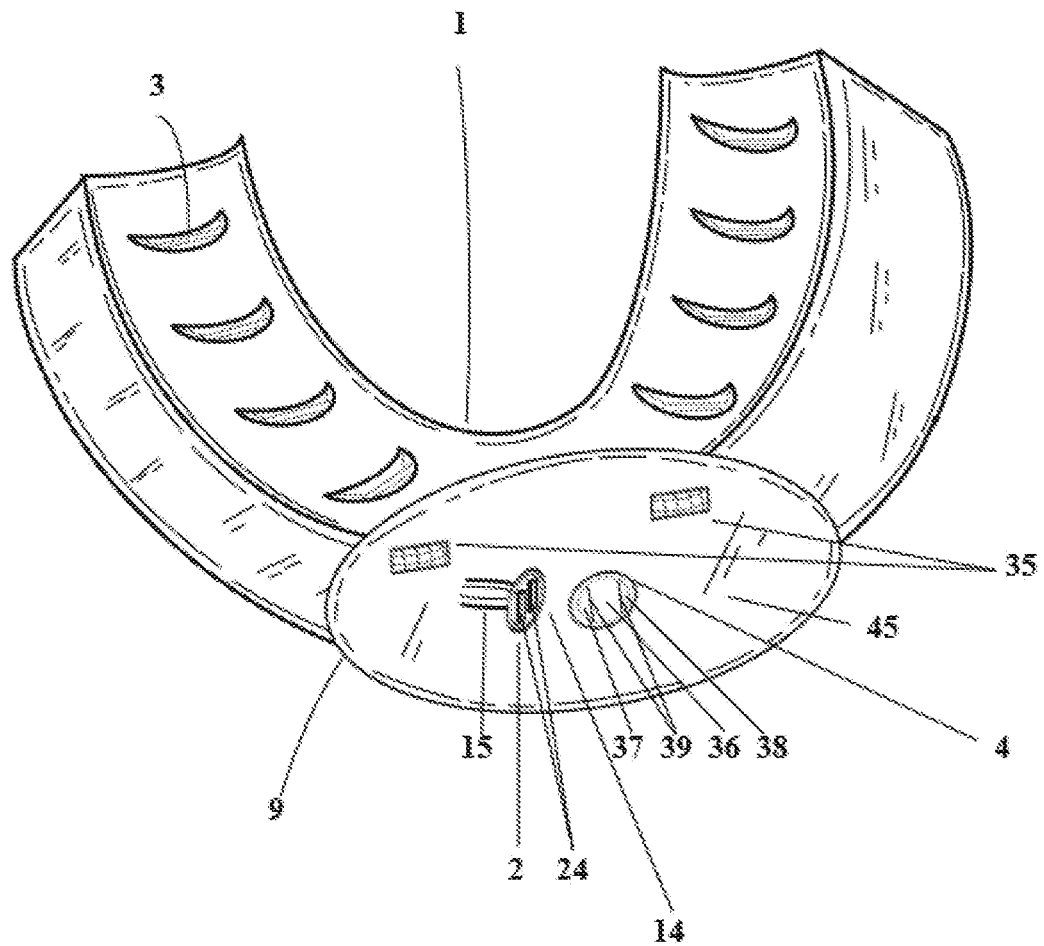
Figure 1C:
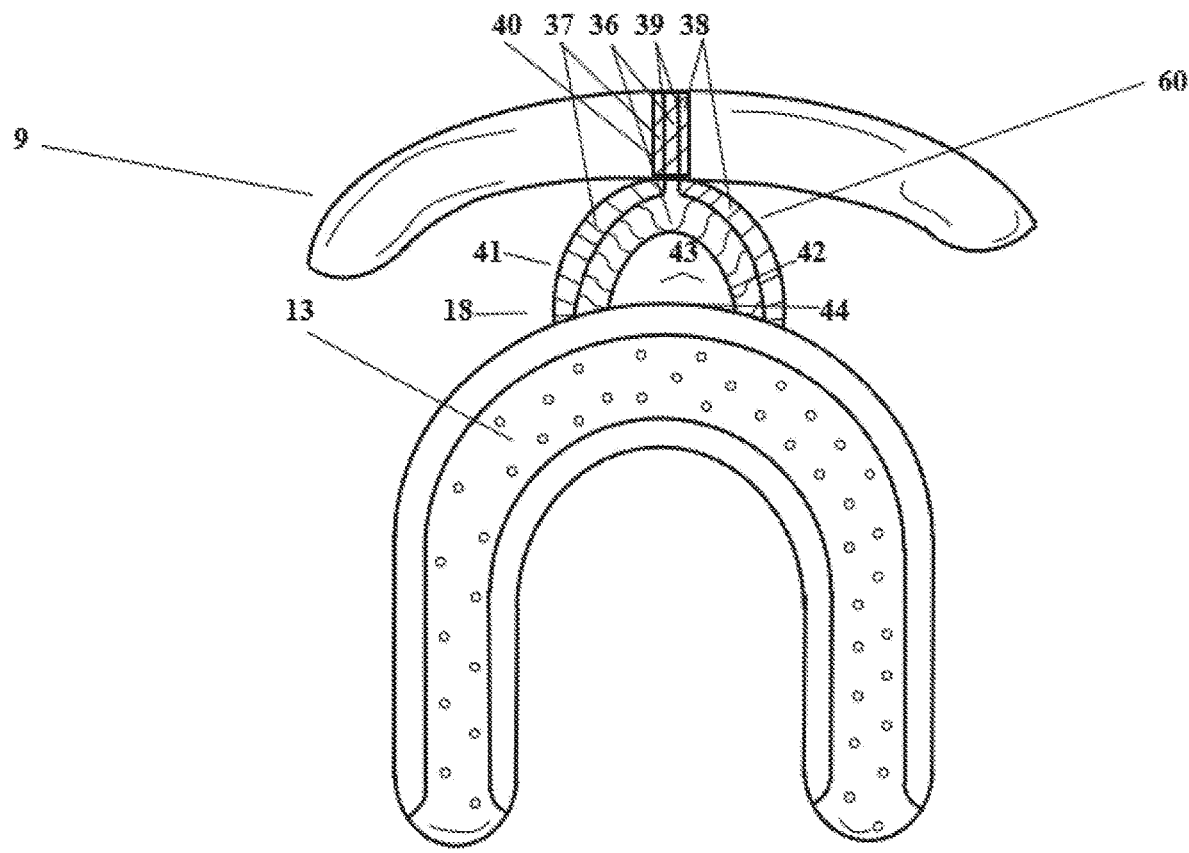

In conjunction with the injection hole (4) the tab (2) is configured to plug and restrict supplements and air from escaping the injection hole (4) region and allocating the pressurized injectable mouthpiece (1) to retain a perpetual amount of pressure in conjunction with the suction vents (3) introducing and releasing air flow and the air pockets (5) introducing and releasing air flow when the pressurized chamber (13) is either at a compressed or decompressed state FIG. 1B.

The pressurized injectable mouthpiece (1) comprises a quadrilateral, spherical, or elliptical-shaped tab (2) comprising a nipple (14) and flange hang (15) whereas the tab (2) is affixed to front base (44) of pressurized injectable mouthpiece (1) and front face (45) of the lip guard (9). Optionally, the tab (2) composes a narrow quadrilateral shape flange hang (15) affixed at a rear exterior region of the tab (2) that partially extends away from the body of the tab (2). Specifically, the flange hang (15) respectively approximately 6.35 mm adjacent the injection hole (4) at the left side.

Additionally, the tab (2) comprises a hollow enclosed nipple (14) forming a quadrilateral, spherical, or elliptical shape partially extending away from the tab (2) body configured to respectively plug the injection hole (4). Otherwise the tab (2) comprises a block shape nipple (14) whereas the mid-region of the block is profoundly recessed.

The tab (2), nipple (14), and flange hang (15) is further made of an rubber type material. Optionally, the pressurized injectable mouthpiece (1) composes a elliptical shape or quadrilateral shape with curved corners lip guard (9) arranged at the front base of the pressurized injectable mouthpiece (1), that traditionally protects the wear lips from further damage. The lip guard (9) forms spaced walls forming a empty hollow region allocating a gel supplement to arrange and deviate the lip guard (9) portion migrating to the pressurized chamber (13). The lip guard (9) is approximately 44.45 mm to 76.2 mm in length and 44.45 mm to 69.85 in height according to overall dimensions. More of, optionally the lip guard (9) arranges a pair of inhalation vents (35) arranged upwardly adjacent the injection hole (4) at opposing regions.

The inhalation vents (35) forms a elliptical, quadrilateral or spherical shape, comprising a waffled pattern.

More of, the front base (44) of the pressurized injectable mouthpiece (1) composes a U-shaped extended region (18) that receives a mid hind-side region of the lip guard (9) composing a supplement channel (60) that respectively corresponds with the injection hole (4) channel (40) that allocates a supplement to enter the extended region (18) via the midpoint channel (36), left channel (37), right channel (38) or a combination thereof.

The extended region (18) further arranges respective spaced top and bottom walls forming a spaced hollow region, the hollow region arranges two vertical walls (39) at opposing regions that respectively bifurcate the midpoint channel (36), left channel (37) and right channel (38) of the supplement channel (60), additionally the supplement channel (60) corresponds with the injection hole (4) channel (40) midpoint channel (36), left channel (37) and right channel (38). Specifically, the extended region (18) outer walls (41) partially flanges outwardly from the front base (44) curving inwardly in direction forming a U-shape receiving a mid hind-side region of the lip guard (9), additionally the extended region (18) inner wall (42) respectively partially flanges outwardly from the front base (44) curving inwardly in direction back towards the front base (44) forming a respective U-shape, whereas in conjunction the outer wall (41) and inner wall (42) forms a U-shape comprising a partial opening (43) in-between the front base (44) and inner wall (42) FIG. 1C.

Figure 1D:
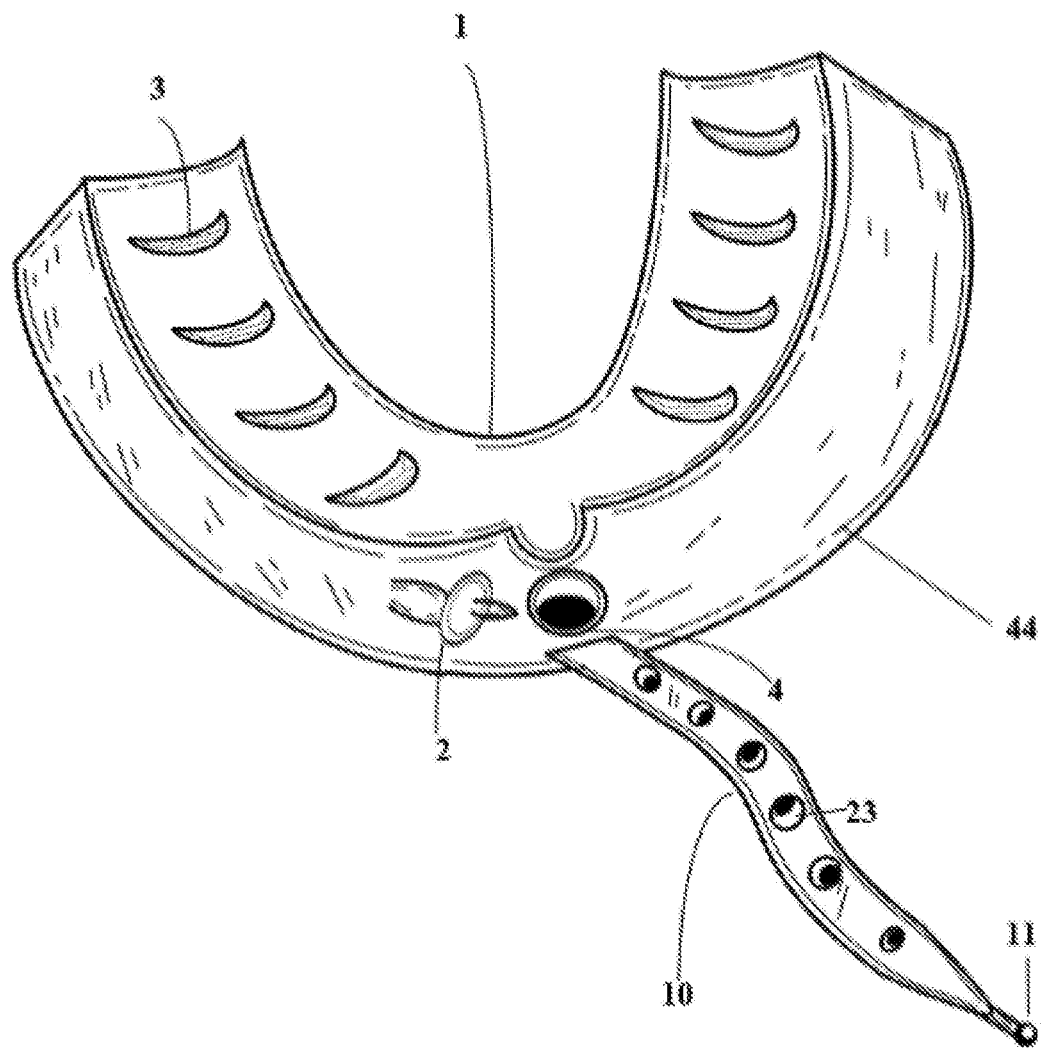

Further, the pressurized injectable mouthpiece (1) comprise a quadrilateral shape tether member (10) marginally adjacent the injection hole (4) that respectively extends from the front base (44) of the pressurized injectable mouthpiece (1) and font face (45) of the lip guard (9) comprising a plurality of recessed openings (23), a far end region slightly reedier in width than the opposing body of the tether member (10), and a fixing knot (11) arranged at the reedier edge region that secures the pressurized injectable mouthpiece (1) to a facemask or similar object FIG. 1D.

The tether member (10) is made of a rubber type material. Additionally, the tether member (10) comprises a plurality of respectively recessed openings (23) contoured as a elliptical, spherical, or quadrilateral shape respectively correspond with the fixing knot (11) shape, arranged throughout its portions approximately 6.35 mm to 19.05 mm adjacent each other. Furthermore, one end region of the tether member (10) comprises a respective fixing knot (11) that respectively corresponds with the tether member (10) recessed openings (23) shape and is slightly larger than the recessed openings (23) according to dimensions arranged at the edge of tether member (10) intended to introduce into at least one recessed opening (23) respectively securing the pressurized injectable mouthpiece (1) to a facemask. The fixing knot (11) is contoured as a elliptical, spherical, or quadrilateral shape, and is made of a rubber type of material. More specifically, the tether member (10) is arranged approximately 6.35 mm above, below, or to the right adjacent the injection hole (4).

Figure 1E:
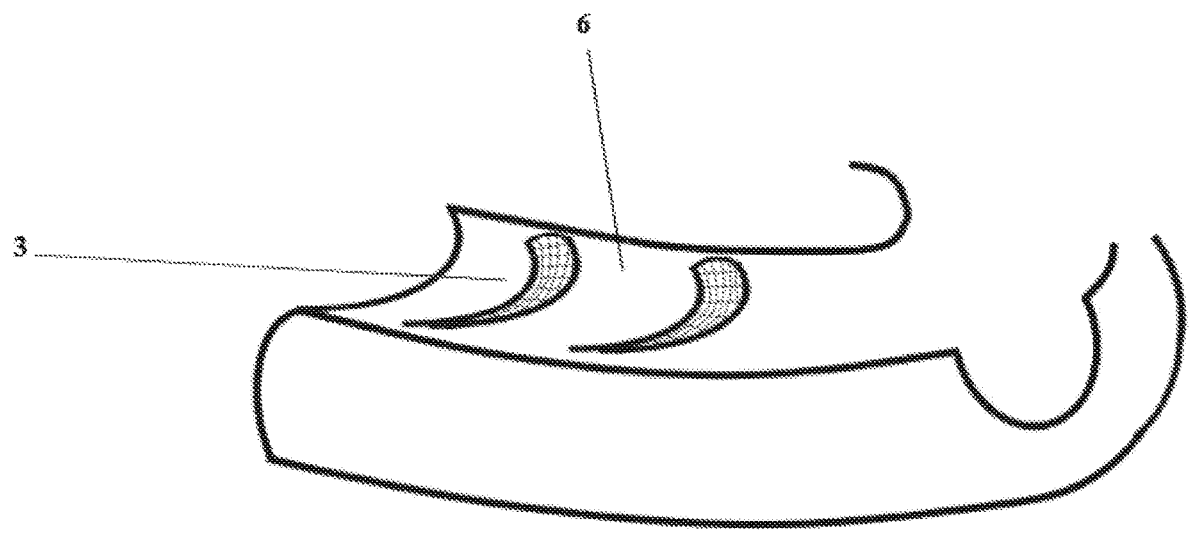

More of, the pressurized injectable mouthpiece (1) comprises several suction vents (3) throughout the top outer base (6) arranged at a horizontal pattern. The suction vents (3) are crescent-moon shape, comprising a waffled pattern. Whereas the waffled pattern arranges miniature holes throughout the circumference intended to allocate a slight release of supplements from the suction vent(s) (3) when the pressurized chamber (13) is at a compressed state and further restricting a profoundly output of supplements when the pressurized chamber (13) is at a decompressed state. Alternatively, the suction vents (3) are contoured as a company logo such as a NIKE swoosh logo, Jordan Jump Man logo, Puma logo, Rebook logo, Adidas logo, Under-Armor logo FIG. 1E.

Further, the suction vents (3) and injection hole (4) can be formed by Diamond-Drag (Scratch) Engraving using a non-rotating tool with a cone-shaped diamond tip, which is dragged with pressure through rubber material, leaving an impression.

Burnishing using a rotating tool with limited pressure, either carbide or a diamond cutter of varying tip width, to remove the top coating or layer of rubber material resulting in a smooth, polished finish. Rotary Engraving using a single or multiple fluted cutting tool which rotates through the work to remove material, leaving a trough of exposed core. Die cutting the process begins when the desired gasket shape is made into a metal die, which is essentially a strip of metal bent into the gasket shape. This metal die is pressed through a material, stamping out the shape. Laser cutting further the gasket shape is inputted into a computer that is connected to the laser cutting machine. Then, as per the computer's queue, a high-powered laser beams maneuvers over the material, cutting extremely precise lines. Hydro-jet cutting this process begins similar to laser cutting since a design is first inputted into a computer. The computer then controls the hydro-jet cutter and sprays a high-pressured jet stream of water through the material.

Figure 1F:
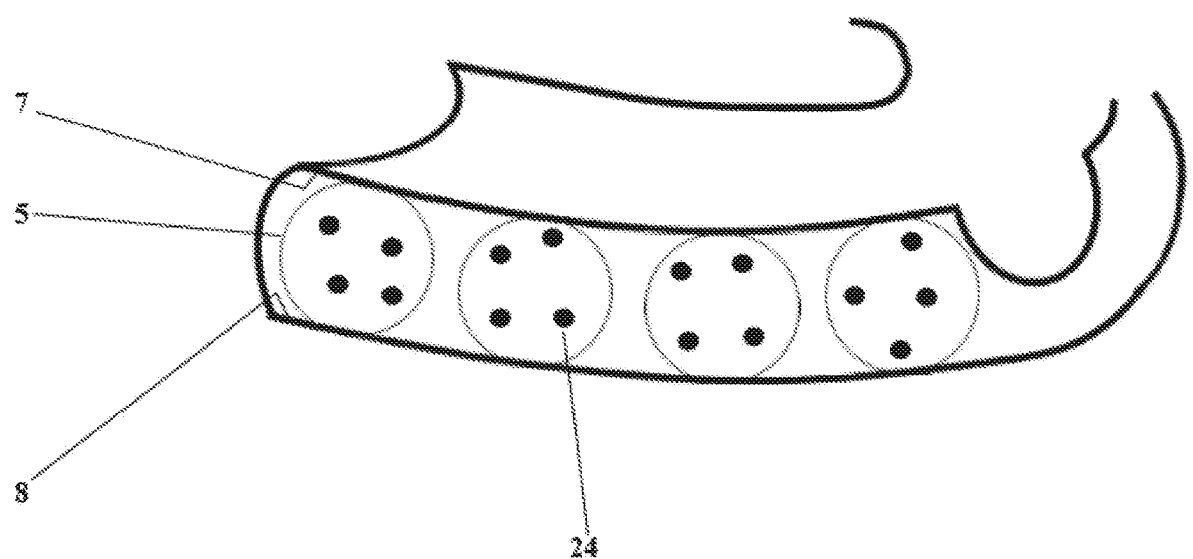
FIG. 1F is a fragmentary perspective view of the suction vents in conjunction with the present invention.
Figure 1G:
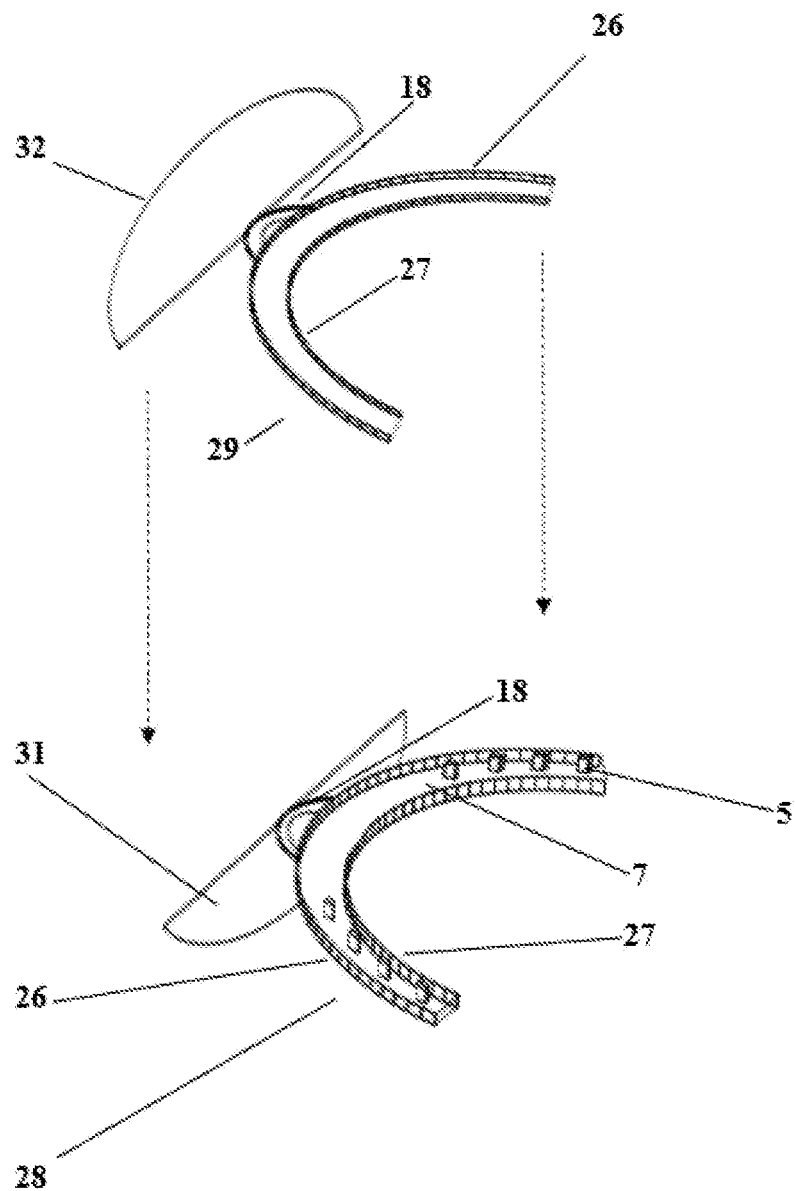
Figure 1H:
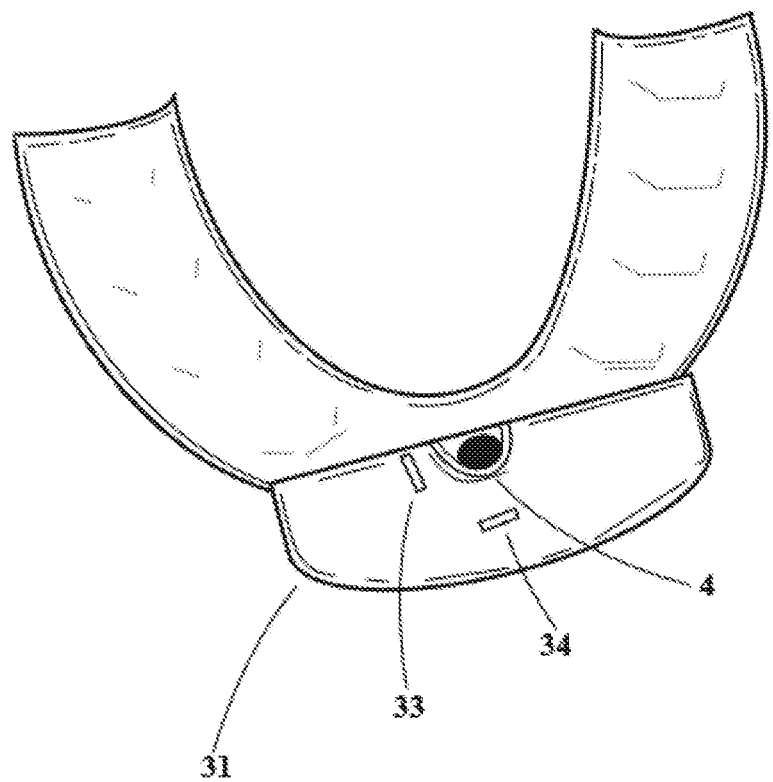
Figure 11:
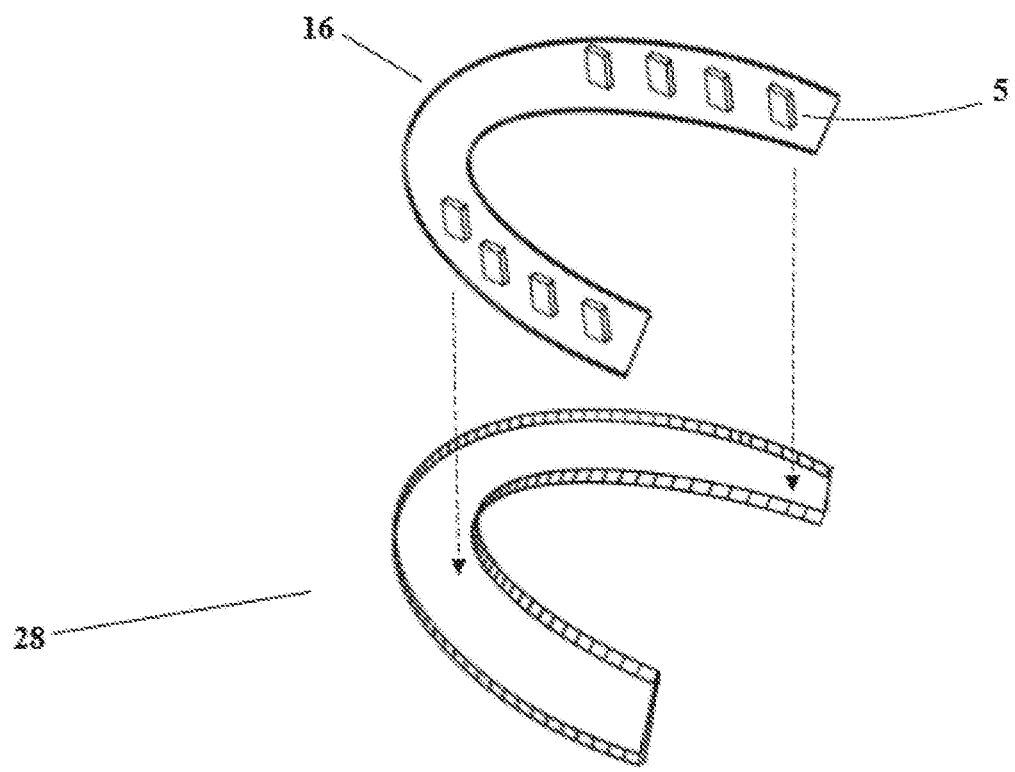
Figure 1J:
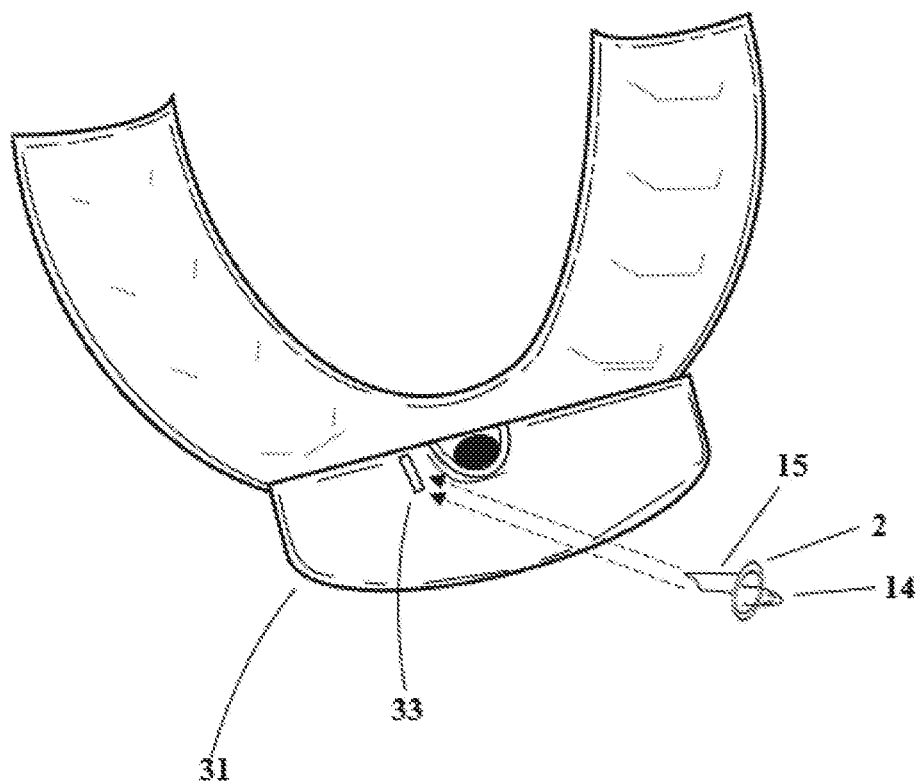
Figure 1K:
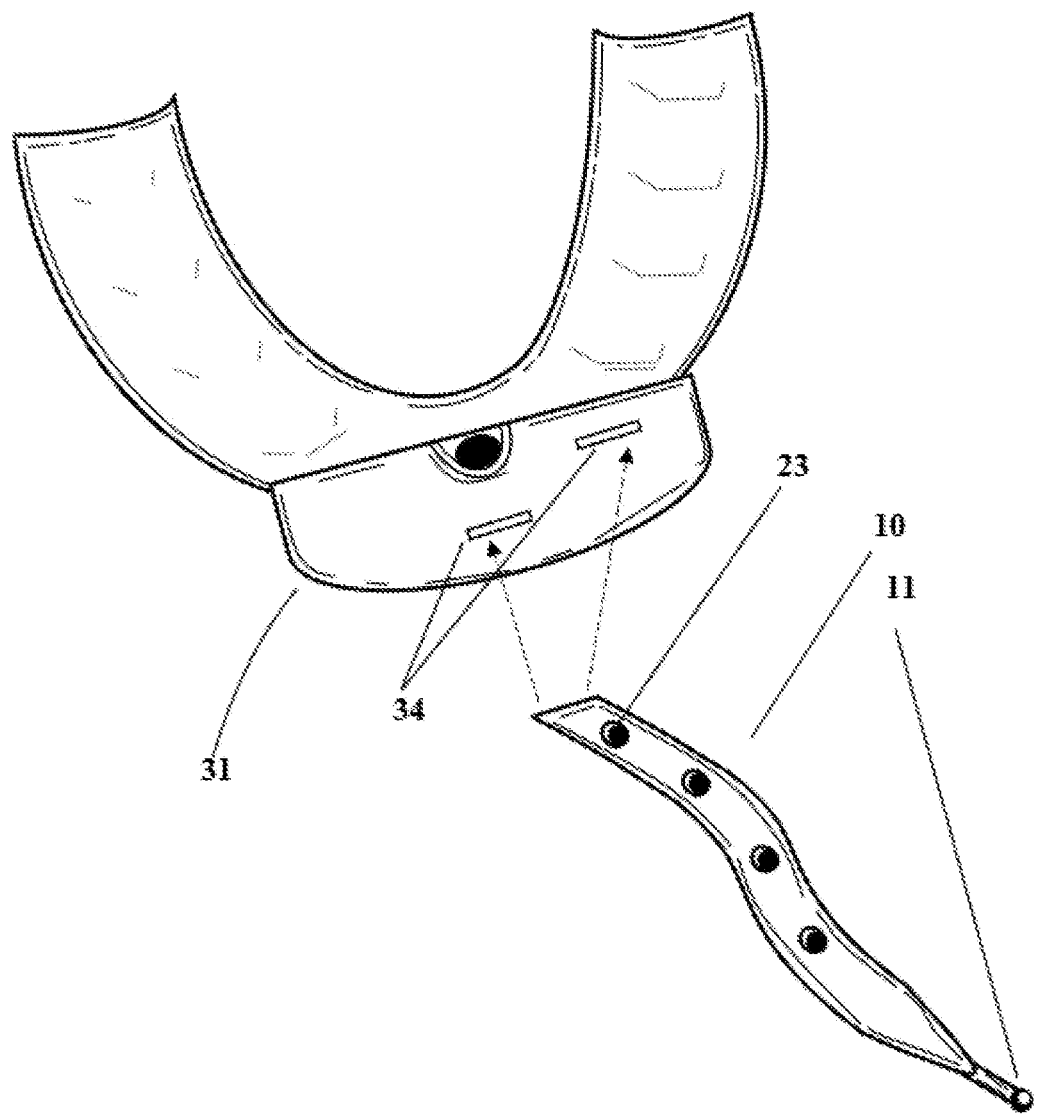

Onto FIG. 1F, here shown the top inner base (7) and bottom inner base (8), further several air pockets (5) are affixed (3D printed) to the left and right side of the top inner base (7) and bottom inner base (8). Generally, many consideration can be taken when forming and affixing the air pockets (5) at the top inner base (7) and bottom inner base (8).

Further, the air pockets (5) allocates the pressurized injectable mouthpiece (1) to be regulated by the amount of pressure respectively applied to top outer base (6) and bottom outer base (12) in response to a user biting down on the pressurized injectable mouthpiece (1). Specifically, the air pockets (5) forms a hollow quadrilateral or spherical shape comprising a plurality of mini openings (24) throughout its exterior circumference allocating air to seep in and out, in response to a user respectively biting down on the top outer base (6) and bottom outer base (12). Generally when a user bite down on the top outer base (6) and bottom outer base (12) pressure is applied to the pressurized chamber (13) in conjunction the air pockets (5) is at a compressed state, further a profoundly amount of air flow is introduce at the pressurized chamber (13) through the suction vents (4) in parallel a profoundly amount of air flow is output from the mini opening (24) at the air pockets (5), upon releasing pressure from the top outer base (6) and bottom outer base (12) in conjunction with the pressurized chamber (13) air entrapped within the pressurized chamber (13) is deviated at the suction vents (4) along with air flow entrapped within the air pockets (5) executing a regulated pressurized task.

In addition, the air pockets (5) are symmetrically directly coupled to either the top inner base (7) or bottom inner base (8) leaving a partial spacing barrier in between either the top inner base (7) or bottom inner base (8), or directly affixed to the top inner base (7) and bottom inner base (8) together with no spacing in between the top and bottom inner base (7, 8).

The air pockets (5) arranges a spacing barrier between the top inner base (7) and bottom inner base (8) of the pressurized chamber (13) allocating a gel-type supplement of a high or low density to arrange within the pressurized chamber (13) without gel-blockage. Further, the air pockets (5) are made of a rubber type material.

Signifying, FIG. 1G-1M shows an structuring of the present invention. For instance, during the 3D printing process the U-shape bottom base layer (28) is respectively formed first, in conjunction the bottom inner base (8) of the bottom base layer (28) comprises an partial recessed region. The bottom base layer (28) comprises an plurality of air pockets (5) respectively formed and respectively spaced approximately 3.35 mm to 6.35 mm adjacent each other where at lease 4 air pockets (5) are affixed at the left and right side of the bottom inner base (8) circumference, the perpendicular length of the air pockets (5) can vary depending if the air pockets (5) are directly or indirectly affixed at the top inner base (6) or bottom inner base (8).

Further, the bottom base layer (28) composes vertical outer walls (26) and inner walls (27) respectively formed following the forming of the air pockets (5), the inner walls (27) and outer walls (26) respectively forms a U-shape, further the front region of the outer walls (26) forms the partial bottom portion of the U-shape extended region (18) and channel walls (39), in conjunction a partial bottom portion lip guard (31) is formed shaped as a half-moon amid the partial spacing at the front region in between the outer walls (26), further a partial bottom portion of the injection hole (4) and channel walls (39) is formed along a mid region at the front face of the partial bottom portion lip guard (31). In parallel, the partial bottom portion lip guard (31) can comprises a recessed slit (33) approximately 6.35 mm in horizontal length so that the tab (2) flange hang (15) edge region can arrange within. Further, the partial bottom portion lip guard (31) can comprises a second recessed slit (34) approximately 6.35 mm to 12.07 mm in horizontal length so that the tether member (2) edge region can arrange within depending on the tether member (10) arrangement adjacent the injection hole (4) FIG. 1H.

Alternatively, when forming the air pocket (5) the laser respectively prints a respective reedy U-shaped intermediate layer (16) that respectively corresponds with the interior of the bottom base layer (28), further the intermediate layer (16) comprises a plurality of air pockets (5) respectively formed and respectively spaced approximately 3.35 mm to 6.35 mm adjacent each other where at lease 4 air pockets (5) are affixed at the left and right side of the intermediate layer (16) circumference. The intermediate layer (16) is respectively affixed within the U-shaped bottom base layer (28) interior where the laser respectively print tacks at edge regions of the intermediate layer (16) and bottom base layer (28) interior walls respectively affixing the intermediate layer (16) at the interior of the bottom base layer (28) FIG. 1I.

In addition, when forming the tab (2) the laser respectively prints a quadrilateral, spherical or elliptical shape tab (2) and nipple (14) at the front face of the tab (2), further the flange hang (15) is formed at the rear of the tab (2) partially extending outwardly in direction away from the tab (2). The edge region of the flange hang (15) is further respectively inserted at the lip guard (9) recessed slit (33), in response the laser respectively prints at the recessed slit region sealing the flange hang (15) within the recessed slit (33) FIG. 1J.

Additionally, when forming the tether member (10) the laser respectively prints a narrow quadrilateral shape tether member (10) and a quadrilateral, spherical or elliptical shape fixing knot (11) at the edge region of the tether member (10). The edge region of the tether member (10) is further respectively inserted at the partial bottom portion lip guard (31) recessed slit (34), in response the laser respectively prints at the recessed slit region sealing the flange hang (15) within the recessed slit (34) FIG. 1K.

Figure 1L:
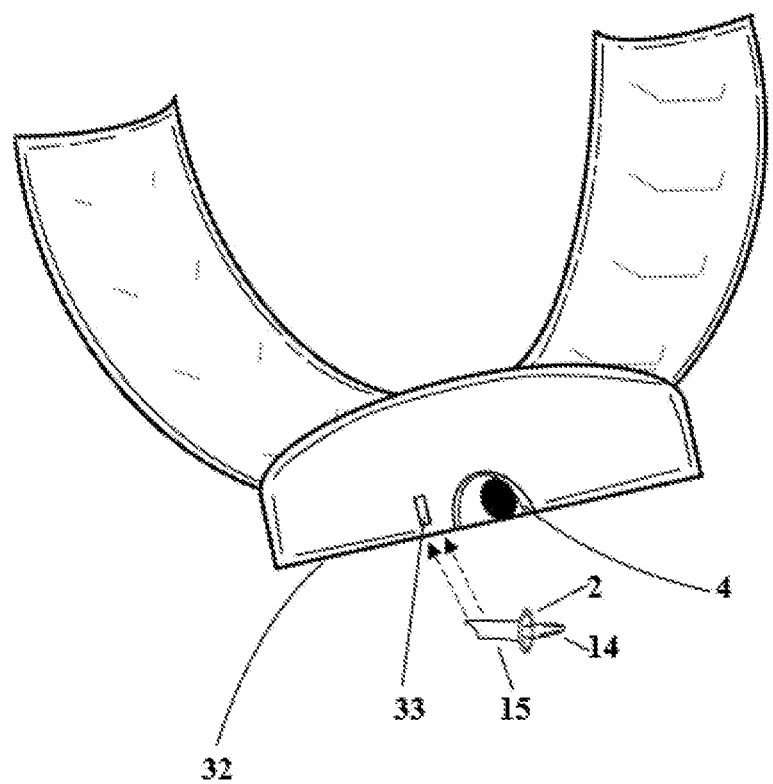
Figure 1M:
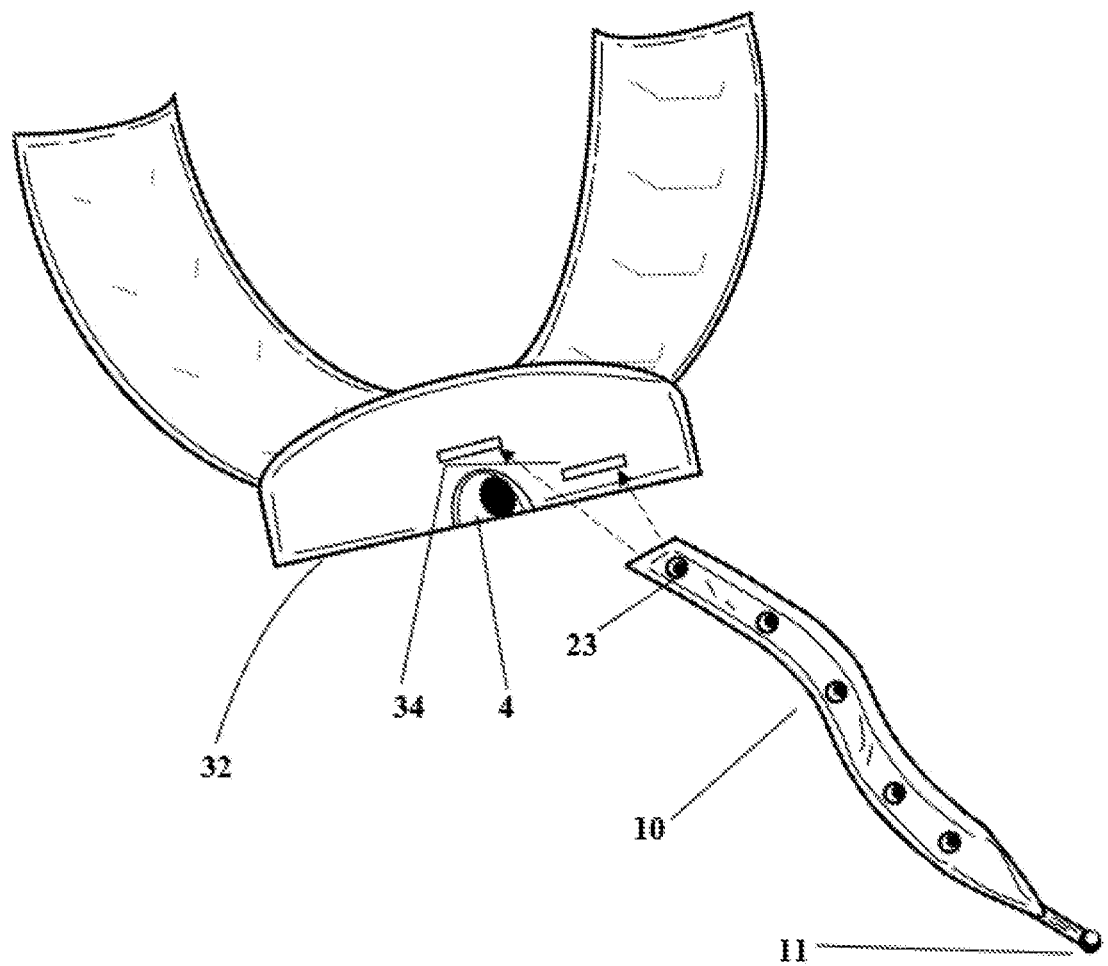

In parallel, the partial top portion lip guard (32) can comprises a recessed slit (33) approximately 6.35 mm in horizontal length so that the tab (2) flange hang (15) edge can arrange within FIG. 1L. The partial top portion lip guard (32) can comprises a second recessed slit (34) approximately 6.35 mm to 12.07 mm in horizontal length so that the tether member (10) edge region can arrange within depending on the tether member (10) arrangement adjacent the injection hole (4) FIG. 1M. Examples of the above mentioned process can be better understood in U.S. Pat. Nos. 4,938,816; 5,817,206; U.S. Appl. Nos. 15,118,989; 4,300,474; and Int Appl. Nos: PCT/EP20 17/07335 1. One skilled in the art(s) could understand the processes and laser positioning.

Although the preceding description contains significant detail, it should not be construed as limiting the scope of the invention but rather as providing illustrations of the preferred embodiment of the invention. It is to be understood that the above description is intended to be illustrative, and not restrictive. Many other embodiments will be apparent to those of skill in the art upon reading and understanding the above description. The scope of the invention should, therefore be determined with reference to the appended claims, along with the full scope of equivalents to which such claims are entitled.

Having described my invention, I claim:

1. A mouthpiece assembly comprising:
   a U-shape mouthpiece having a pressurized chamber for containing a supplement and a lip guard coupled to said U-shape mouthpiece;
   an injection hole configured to obtain the supplement formed at a mid-center region of said U-shape mouthpiece;
   a supplement channel prolonging from said injection hole to said pressurized chamber, said supplement chamber defined by a midpoint channel configured to dispense the supplement to a left and right side of said pressurized chamber, a left channel configured to dispense the supplement to the left side of said pressurized chamber and a right channel configured to dispense the supplement to the right side of said pressurized chamber;

a plurality of suction vents formed on a top outer base of said U-shape mouthpiece configured to release the supplement;

a plurality of air pockets within said pressurized chamber; and a tab coupled to said mouthpiece configured to seal said injection hole;

wherein said U-shape mouthpiece is constructed such that when a user bites down on said U-shape mouthpiece, pressure is applied to said pressurized chamber and the plurality of air pockets constituting a compressed state causing a slight release of the supplements from the plurality of suctions vents, and the plurality of air pockets restricts the release of the supplements when said pressurized chamber is at a decompressed state.

2. The mouthpiece assembly of claim 1, wherein said lip guard is approximately 44.45 mm to 76.2 mm in length and 44.45 mm to 69.85 in height according to overall dimensions.

3. The mouthpiece assembly of claim 1, wherein said injection hole is approximately 3 mm to 6 mm in diameter.

4. The mouthpiece assembly of claim 1, wherein said injection hole is of a quadrilateral, spherical, or elliptical shape.

5. The mouthpiece assembly of claim 1, further comprising a tether member for securing said mouthpiece to a facemask.

6. The mouthpiece assembly of claim 5, wherein said tether member is arranged approximately 6.35 mm above, below, or to a side of said injection hole.

7. The mouthpiece assembly of claim 1, wherein the plurality of suction vents is formed in a shape comprising a circumference, and wherein the plurality of suction vents comprises a waffled pattern of miniature holes within the circumference of the shape configured to release the supplement.

8. The mouthpiece assembly of claim 7, wherein said suction vents are crescent-moon shape.

9. The mouthpiece assembly of claim 7, wherein said suction vents are contoured as a company logo.

10. The mouthpiece assembly of claim 1, further including a nipple on said tab to plug said injection hole and a flange hang to secure said tab to said lip guard.

11. The mouthpiece assembly of claim 1, wherein the plurality of air pockets comprises a plurality of mini openings throughout an exterior circumference allocating air to seep in and out in response to the user respectively biting down on the mouthpiece.

\* \* \* \* \*